(12) United States Patent
Celebisoy

(10) Patent No.: US 8,499,341 B2
(45) Date of Patent: Jul. 30, 2013

(54) RESUMABLE PRIVATE BROWSING SESSION

(75) Inventor: Berk C. Celebisoy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 13/019,105

(22) Filed: Feb. 1, 2011

(65) Prior Publication Data

US 2012/0198524 A1    Aug. 2, 2012

(51) Int. Cl.
*G06F 17/30* (2006.01)
(52) U.S. Cl.
USPC .......................................................... 726/5
(58) Field of Classification Search
USPC .......................................................... 726/5
See application file for complete search history.

(56) References Cited

U.S. PATENT DOCUMENTS

| | | | |
|---|---|---|---|
| 6,411,989 B1 | 6/2002 | Anupam et al. | |
| 7,526,762 B1 | 4/2009 | Astala et al. | |
| 2002/0032731 A1 | 3/2002 | Qian et al. | |
| 2003/0195963 A1 | 10/2003 | Song et al. | |
| 2004/0143738 A1* | 7/2004 | Savage et al. | 713/168 |
| 2005/0066037 A1 | 3/2005 | Song et al. | |
| 2007/0233880 A1* | 10/2007 | Nieh et al. | 709/227 |
| 2009/0164581 A1 | 6/2009 | Bove et al. | |
| 2012/0185949 A1* | 7/2012 | Phillips et al. | 726/26 |

OTHER PUBLICATIONS

"International Search Report" Mailed Date Aug. 31, 2012, Application No. PCT/US2012/022283, Filing Date : Jan. 24, 2012.
"Save & load multiple sessions in Google Chrome", Retrieved at << http://www.tothepc.com/archives/save-load-multiple-sessions-in-google-chrome/ >>, Retrieved Date : Nov. 16, 2010, pp. 5.
"Internet Explorer 7 Addons—How to Save your Internet Explorer Session", Retrieved at << http://www.online-tech-tips.com/internet-explorer-tips/internet-explorer-7-addons-how-to-save-your-internet-explorer-session/ >>, Mar. 21, 2007, pp. 6.
Song, et al., "Browser State Repository Service", Retrieved at << http://citeseerx.ist.psu.edu/viewdoc/summary?doi= 10.1.1.10.3836 >>, Proceedings of the First International Conference on Pervasive Computing, 2002, pp. 14.
Potter, et al., "WebPod: Persistent Web Browsing Sessions with Pocketable Storage Devices", Retrieved at << http://www.cs.columbia.edu/techreports/cucs-047-04.pdf >>, Proceedings of the 14th international conference on World Wide Web, May 10-14, 2005, p. 603-612.
Eaton, Nick, "Sneak Peek: Microsoft releases IE8 Beta 2", Retrieved at << http://blog.seattlepi.com/microsoft/month.asp?blogmonth=8/1/2008 >>, Aug. 29, 2008, pp. 9.

* cited by examiner

*Primary Examiner* — Kambiz Zand
*Assistant Examiner* — Aubrey Wyszynski
(74) *Attorney, Agent, or Firm* — Alleman Hall McCoy Russell & Tuttle LLP

(57) ABSTRACT

A resemble private browsing session is activated on a network computing device communicatively coupled via a network to other network computing devices. The private browsing session restrictedly saves one or more network browsing memories corresponding to activity between the network computing device and other network computing devices. The one or more network browsing memories are restrictedly saved under protection of a private credential. After the private browsing session has ended, access to the private browsing session is blocked unless a received credential submission matches the private credential. If the received credential submission matches the private credential, the private browsing session is resumed with access to the one or more network browsing memories.

20 Claims, 2 Drawing Sheets

RESUMABLE PRIVATE BROWSING SESSION

BACKGROUND

Internet browsers and other applications may be used by network computing devices to access information saved on other network computing devices that are remotely located. For example, web sites served by remote computers may be browsed, data stored by remote computers may be downloaded, and email messages may be sent to and received from remote servers. Each one of these interactions between remotely located network computers is a potential network browsing memory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A private browsing session is activated on a network computing device communicatively coupled via a network to other network computing devices. The private browsing session restrictedly saves one or more network browsing memories corresponding to activity between the network computing device and other network computing devices. The one or more network browsing memories are restrictedly saved under protection of a private credential. After the private browsing session has ended, access to the private browsing session is blocked unless a received credential submission matches the private credential. If the received credential submission matches the private credential, the private browsing session is resumed with access to the one or more network browsing memories.

DETAILED DESCRIPTION

According to the present disclosure, a user is able to recover a private Internet browsing session after the private browsing session is interrupted. As such, the time and effort a user puts into a private browsing session is not wasted if the private browsing session is interrupted. Instead of erasing all traces of network activity upon interruption of the private browsing session, the activity of the private browsing session is saved under the protection of a private credential, such as a password. The user may use the private credential to resume the saved private browsing session at a later time. Because the browsing session is saved under the protection of a private credential, the browsing session can be kept private from unauthorized parties without access to the private credential. Furthermore, because the browsing session is saved and can be accessed after it has been interrupted, the user is able to accumulate and/or review browsing information from any number of different browsing sessions, no matter how much time passes between the browsing sessions.

Figure 1:
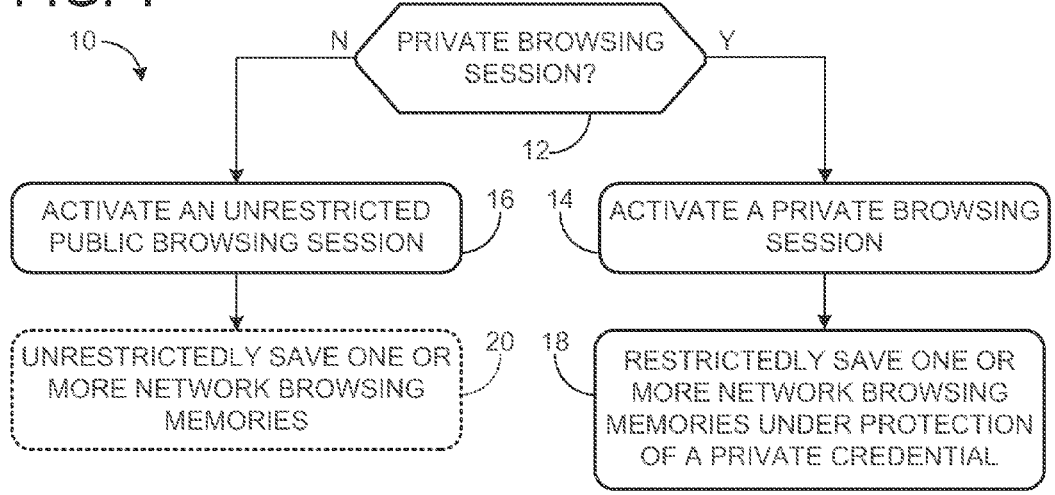
FIG. 1 shows a method of establishing browser privacy via resumable private browsing sessions in accordance with an embodiment of the present disclosure.

FIG. 1 shows an example method 10 of establishing browser privacy via resumable private browsing sessions. Method 10 may be performed by a network computing device communicatively coupled to other network computing devices. As a nonlimiting example, a network computing device in the form of a personal computer or a mobile communication device may be communicatively coupled via the Internet to other network computing devices in the form of server computers. In such a case, the personal computer or mobile communication device may include a browser application programmed to allow resumable private browsing sessions. Personal computers and mobile communication devices are nonlimiting examples of suitable network computing devices, and the Internet is a nonlimiting example of a suitable network. A more general description of compatible network computing devices and networks is provided below with reference to FIG. 6.

At 12, method 10 includes determining if a private browsing sessions is to be activated. If a private browsing session is to be activated (Yes at 12), method 10 proceeds to 14, and the private browsing session is activated. If a private browsing session is not to be activated (No at 12), method 10 proceeds to 16, and an unrestricted public browsing session is activated. In other words, either a private browsing session or an unrestricted public browsing session may be selectively activated. Nonlimiting examples of such selection are provided below with reference to FIGS. 3-5.

As indicated at 18, when a private browsing session is activated, the private browsing session restrictedly saves one or more network browsing memories. As used herein, a network browsing memory refers to any savable information corresponding to activity between the network computing device and other network computing devices. Nonlimiting examples of network browsing memories include, but are not limited to: browser history (e.g., list of sites visited during private browsing session), browser bookmarks, network downloads, contact information (e.g., .vcards saved and/or updated during private browsing session), communication information (e.g., email messages, SMS messages, VOIP recordings, chat transcripts, audio and/or video chat recordings, etc.), user preferences (e.g., browser settings), temporary Internet files, browser cookies, browser auto-fill information, user notes, user web page annotations, and the like.

Such network browsing memories may be restrictively saved for a private browsing session. In other words, the network browsing memories may be saved under protection of a private credential so that only users that can supply that private credential will be able to access the restrictedly saved network browsing memories. In some embodiments, the private credential may take the form of a password. In other embodiments, the private credential may take the form of a biometric credential (e.g., fingerprint, voice pattern, etc.), a synchronized code provided by an electronic key fob, or another suitable mechanism for providing private access.

A user may maintain two or more different private browsing sessions without departing from the scope of this disclosure. In other words, each private browsing session may be one of a plurality of different private browsing sessions, and each private browsing session may restrictedly save one or more network browsing memories apart from network browsing memories for other private browsing sessions. As an example, a user may separate research for two different projects into two different private browsing sessions. As such, when a user resumes a particular browsing session for a particular research project, only the network browsing memories corresponding to that particular research project will be resumed.

In some embodiments, each private browsing session may be restrictedly saved under protection of a different password. In some embodiments, each private browsing session or a set of private browsing sessions may be restrictedly saved under protection of a shared master credential—e.g., a single master credential may be used to access any of that user's private browsing sessions, which may or may not be further protected by session-specific private credentials.

A private browsing session and its corresponding network browsing memories may be saved locally on the network computing device. When saved locally, saved data may be encrypted or otherwise secured so that the saved data cannot be accessed without the private credential.

In some embodiments, a private browsing session and its corresponding browsing memories may be remotely saved on a remote network computing device. The private browsing session may be saved as part of a network-accessible user account, for example. The saved data may be encrypted or otherwise secured. When saved remotely, the private browsing session may be resumed from any compatible network computing device having access to the network-accessible user account and/or remote network computing device. In this way, a user may begin a private browsing session on a first device (e.g., a home computer) and then subsequently resume the same private browsing session on a second device (e.g., a work computer).

One or more suitable data structures may be used to save the network browsing memories. Different network browsing memories may be wrapped in a container or independently saved. In some embodiments, a data structure that serves as an index may be saved as part of the private browsing session.

As indicated at 20, when an unrestricted public browsing session is activated, the public browsing session may unrestrictedly save one or more network browsing memories. When saved, such network browsing memories are not saved under the protection of a private credential. The unrestricted network browsing memories may be accessed by any user with access to the network computing device. As such, the public browsing session is not private. Nonetheless, when such network browsing memories are unrestrictedly saved, the public browsing session may be resumed if it is interrupted. In some embodiments, an unrestricted public browsing session does not save network browsing memories for resumed access after interruption.

As introduced above, a user may choose whether a browsing session will be public or private. As such, the user may use a computing device while maintaining a desired level of privacy. Furthermore, the user may share the computing device, and even the user's account, without exposing network browsing memories the user wishes to keep secret.

Figure 2:
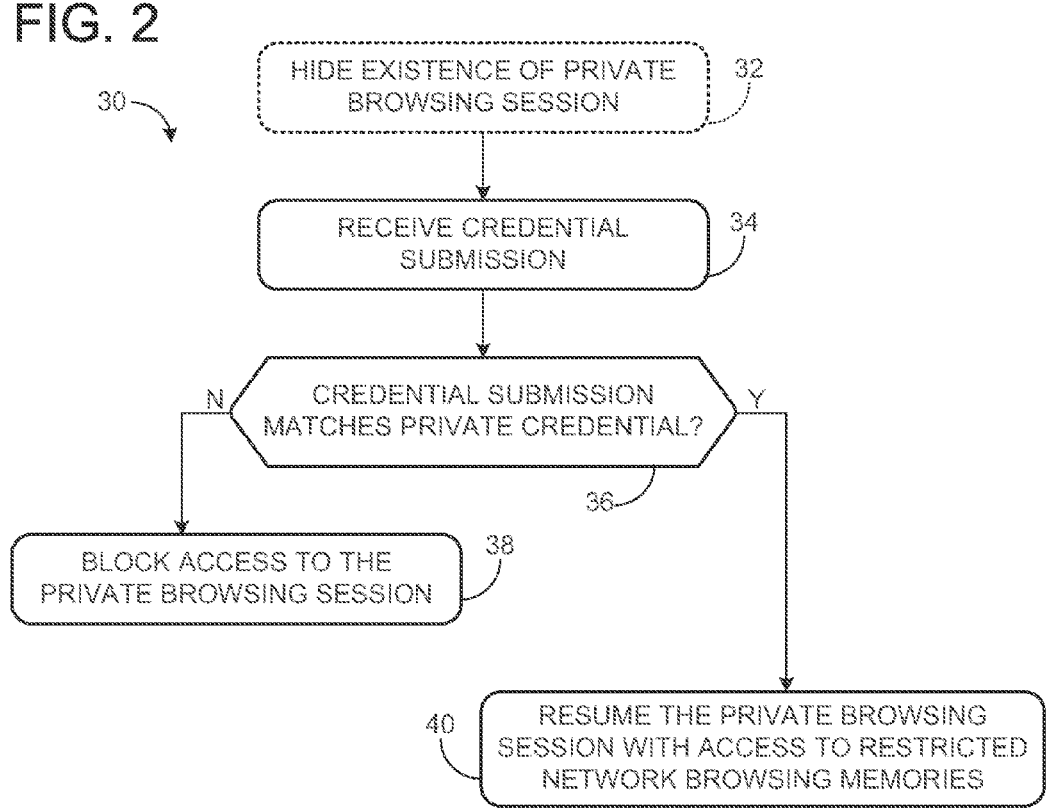
FIG. 2 shows a method of maintaining browser privacy via resumable private browsing sessions in accordance with an embodiment of the present disclosure.

FIG. 2 shows a method 30 of maintaining browser privacy via resumable private browsing sessions. At 32, method 30 optionally includes hiding the existence of the private browsing session. In other words, an Internet browser and/or other application may be configured to conceal whether or not a private browsing session has been saved so that unauthorized users are not even alerted to the presence of a private browsing session.

Figure 3:
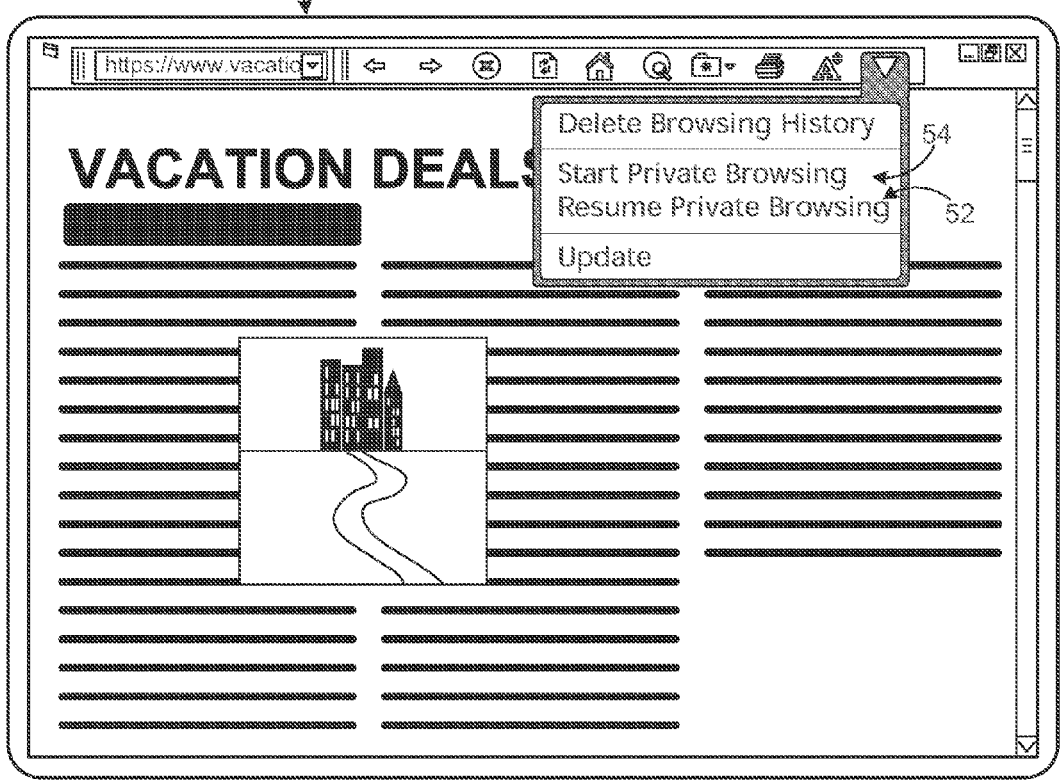
FIG. 3 shows an example Internet browser in accordance with an embodiment of the present disclosure.

At 34, method 30 includes receiving a credential submission. As a nonlimiting example, FIG. 3 shows an example Internet browser 50 that includes a user interface option 52 that allows a user to attempt to resume a private browsing session. In the illustrated example, the user interface option 52 does not indicate whether or not a private browsing session has been created, thus hiding the existence of any private browsing sessions that do exist.

Figure 4:
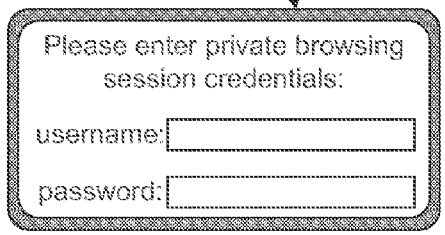
FIG. 4 shows a credential validation interface in accordance with an embodiment of the present disclosure.

As shown in FIG. 4, upon selecting the user interface option 52 of FIG. 3, the user may be presented with a credential validation interface 60. In the illustrated example, the private credential is a password, and thus the credential validation interface 60 is a password entry interface. In other embodiments, credential validation may include a fingerprint check or other form of authentication. The password entered via credential validation interface 60 may be received by Internet browser 50 or another suitable authentication/validation tester. It is to be understood that the above interfaces are provided as examples and are not intended to be limiting in any way.

Turning back to FIG. 2, at 36 method 30 includes determining if a credential submission matches the private credential for a private browsing session or a set of private browsing sessions. For example, the password a user enters via credential validation interface 60 of FIG. 4 may be compared to the private credential that protects a particular private browsing session or the private credential that protects a set of two or more private browsing sessions.

At 38, if the credential submission does not match the private credential (No at 36), method 30 includes blocking access to the private browsing session. While FIG. 2 shows access being blocked in response to a credential submission that does not match a private credential, it is to be understood that access is also blocked if no credential submission is made. In other words, after the private browsing session has ended, access to the private browsing session is blocked unless a received credential submission matches the private credential.

Accordingly, if the credential submission matches the private credential (Yes at 36), at 40, method 30 includes resuming the private browsing session with access to the one or more network browsing memories. When the private browsing session is resumed, the network computing device may automatically load the network browsing memories so as to provide the user with the same experience the user would have had if the user had not interrupted the resumed private browsing session. As nonlimiting examples, previously saved bookmarks may be made available, the browser history may be restored, previously downloaded files may be made visible and accessible, etc. On the other hand, if the private browsing session is not resumed, access to such network browsing memories remains blocked.

In addition to resuming a private browsing session, a user may perform administrative maintenance of various private browsing sessions if the credential submission matches the private credential. As one nonlimiting example, a user may delete one or more private browsing sessions and the corresponding network browsing memories. Such private browsing sessions may be deleted from a local network computing device and/or a remote network computing device. Once deleted in this manner, the deleted network browsing memories are not accessible, even if a subsequent credential submission matches the private credential that was used to protect those network browsing memories.

In some embodiments, the private browsing session may be selectively activated before the private browsing session begins. As one nonlimiting example, FIG. 3 shows an example Internet browser 50 that includes a user interface option 54 that allows a user to proactively activate a private browsing session. A user may proactively activate a private browsing session at the beginning of the browsing session, in the middle of the browsing session, or at the end of the browsing session. If activated at the beginning or middle of the browsing session, the user may continue private browsing and all subsequent network browsing memories may be saved under protection of a private credential. If activated at the middle or the end of the browsing session, network browsing memories that were saved before the private browsing session was activated may be saved under protection of a private credential.

Figure 5:
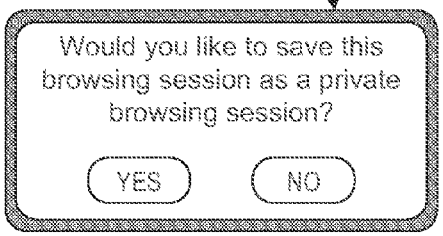
FIG. 5 shows a user decision interface in accordance with an embodiment of the present disclosure.

In some embodiments, the private browsing session may be selectively activated by converting an unrestricted public browsing session into the private browsing session after the unrestricted public browsing session begins. As one nonlimiting example, an Internet browser or other application may prompt a user to save an unrestricted public browsing session as a private browsing session. FIG. 5 shows an example user decision interface 70 that may be presented to the user when the user closes a browser window or otherwise indicates that a browsing session is ending. The user decision interface allows the user to specify whether the previously unrestricted public browsing session should be saved as a private browsing session. In such embodiments, if the user indicates that the session is to be saved as a private browsing session, then any unrestricted network browsing memories from the unrestricted public browsing session may be saved for subsequent resumption. Furthermore, access to those network browsing memories may be blocked under protection of the private credential.

In some embodiments, the above described methods and processes may be tied to a computing system including one or more computers. In particular, the methods and processes described herein may be implemented as a computer application, computer service, computer API, computer library, and/or other computer program product.

Figure 6:
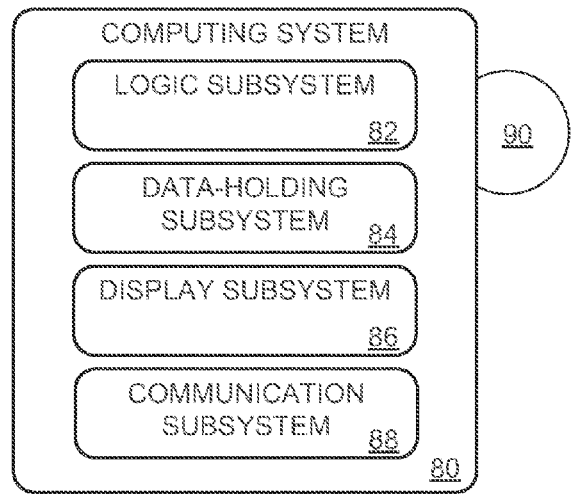
FIG. 6 schematically shows a computing system in accordance with an embodiment of the present disclosure.

FIG. 6 schematically shows a nonlimiting computing system 80 that may perform one or more of the above described methods and processes (e.g., computing system 80 may serve as the network accessible computing device executing Internet browser 50 of FIG. 3). Computing system 80 is shown in simplified form. It is to be understood that virtually any computer architecture may be used without departing from the scope of this disclosure. In different embodiments, computing system 80 may take the form of a mainframe computer, server computer, desktop computer, laptop computer, tablet computer, home entertainment computer, mobile computing device, mobile communication device, gaming device, etc.

Computing system 80 includes a logic subsystem 82 and a data-holding subsystem 84. Computing system 80 may optionally include a display subsystem 86, communication subsystem 88, and/or other components not shown in FIG. 6. Computing system 80 may also optionally include user input devices such as keyboards, mice, game controllers, cameras, microphones, and/or touch screens, for example.

Logic subsystem 82 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 84 may include one or more physical, non-transitory, devices configured to hold data and/or instructions executable by the logic subsystem to implement the herein described methods and processes. When such methods and processes are implemented, the state of data-holding subsystem 84 may be transformed (e.g., to hold different data).

Data-holding subsystem 84 may include removable media and/or built-in devices. Data-holding subsystem 84 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 84 may include devices with one or more of the following characteristics: volatile, nonvolatile, dynamic, static, read/write, read-only, random access, sequential access, location addressable, file addressable, and content addressable. In some embodiments, logic subsystem 82 and data-holding subsystem 84 may be integrated into one or more common devices, such as an application specific integrated circuit or a system on a chip.

FIG. 6 also shows an aspect of the data-holding subsystem in the form of removable computer-readable storage media 90, which may be used to store and/or transfer data and/or instructions executable to implement the herein described methods and processes. Removable computer-readable storage media 90 may take the form of CDs, DVDs, HD-DVDs, Blu-Ray Discs, EEPROMs, and/or floppy disks, among others.

It is to be appreciated that data-holding subsystem 84 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 86 may be used to present a visual representation of data held by data-holding subsystem 84. As the herein described methods and processes change the data held by the data-holding subsystem, and thus transform the state of the data-holding subsystem, the state of display subsystem 86 may likewise be transformed to visually represent changes in the underlying data. Display subsystem 86 may include one or more display devices utilizing virtually any type of technology. Such display devices may be combined with logic subsystem 82 and/or data-holding subsystem 84 in a shared enclosure, or such display devices may be peripheral display devices.

When included, communication subsystem 88 may be configured to communicatively couple computing system 80 with one or more other computing devices. Communication subsystem 88 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 80 to send and/or receive messages to and/or from other devices via a network such as the Internet. Furthermore, communication subsystem 88 may be used to download executable instructions from remote computing devices. As an example, the instructions used to execute the above described methods may be saved on and distributed from a remote server computer, and such instructions may be downloaded from the remote server computer to data-holding subsystem 84 via communication subsystem 88.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A data-holding subsystem holding instructions executable by a logic subsystem to:
    selectively activate either an unrestricted public browsing session or a private browsing session on a network computing device communicatively coupled via a network to other network computing devices, the private browsing session restrictedly saving, under protection of a private credential, one or more network browsing memories corresponding to activity between the network computing device and other network computing devices;
    after the private browsing session is ended, block access to the private browsing session unless a received credential submission matches the private credential; and
    if the received credential submission matches the private credential, resume the private browsing session with access to the one or more network browsing memories.

2. The data-holding subsystem of claim 1, wherein the network browsing memories are restrictedly saved on the network computing device.

3. The data-holding subsystem of claim 1, wherein the network browsing memories are restrictedly saved on a remote network computing device as part of a network-accessible user account.

4. The data-holding subsystem of claim 1, wherein the network browsing memories include browser history.

5. The data-holding subsystem of claim 1, wherein the network browsing memories include browser bookmarks.

6. The data-holding subsystem of claim 1, wherein the network browsing memories include network downloads.

7. The data-holding subsystem of claim 1, wherein the network browsing memories include contact information.

8. The data-holding subsystem of claim 1, wherein the network browsing memories include communication information.

9. The data-holding subsystem of claim 1, wherein the network browsing memories include user preferences.

10. The data-holding subsystem of claim 1, wherein the network browsing memories include form auto-fill information.

11. The data-holding subsystem of claim 1, wherein the network browsing memories include browser cookies.

12. The data-holding subsystem of claim 1, wherein the private browsing session is one of a plurality of private browsing sessions, each private browsing session restrictedly saving one or more network browsing memories apart from network browsing memories restrictedly saved for other private browsing sessions.

13. The data-holding subsystem of claim 12, wherein each private browsing session is restrictedly saved under protection of a different password.

14. The data-holding subsystem of claim 12, wherein each private browsing session is restrictedly saved under protection of a shared master credential.

15. The data-holding subsystem of claim 1, wherein the private browsing session is selectively activated before the private browsing session begins.

16. The data-holding subsystem of claim 1, wherein the private browsing session is selectively activated by converting an unrestricted public browsing session into the private browsing session after the unrestricted public browsing session begins, and wherein any unrestricted network browsing memories from the unrestricted public browsing session are saved under protection of the private credential upon the unrestricted public browsing session being converted into the private browsing session.

17. The data-holding subsystem of claim 1, wherein existence of the private browsing session is hidden until a received credential submission matches the private credential.

18. A data-holding subsystem holding instructions executable by a logic subsystem to:
    activate a private browsing session on a network computing device communicatively coupled via a network to other network computing devices, the private browsing session restrictedly saving one or more network browsing memories corresponding to activity between the network computing device and other network computing devices, the one or more network browsing memories being restrictedly saved under protection of a private credential on a remote network computing device as part of a network-accessible user account;
    after the private browsing session is ended, block access to the private browsing session unless a received credential submission matches the private credential; and
    if the received credential submission matches the private credential, resume the private browsing session with access to the one or more network browsing memories.

19. The data-holding subsystem of claim 18, wherein the private browsing session is one of a plurality of private browsing sessions, each private browsing session restrictedly saving one or more network browsing memories apart from network browsing memories restrictedly saved for other private browsing sessions.

20. A method of protecting browser privacy, comprising:
    selectively activating either an unrestricted public browsing session or a private browsing session on a network computing device communicatively coupled via a network to other network computing devices, the private browsing session restrictedly saving, under protection of a private credential, one or more network browsing memories corresponding to activity between the network computing device and other network computing devices;

after the private browsing session is ended, blocking access to the private browsing session unless a received credential submission matches the private credential; and if the received credential submission matches the private credential, resuming the private browsing session with access to the one or more network browsing memories.

* * * * *